United States Patent [19]

Götz et al.

[11] Patent Number: 5,049,266

[45] Date of Patent: Sep. 17, 1991

[54] DEVICE AND METHOD FOR MICROBIOLOGICAL WATER TREATMENT

[75] Inventors: Helmut Götz, Regensdorf; Ludwig Scheibinger, Munich; Peter Steinbach, Kallstadt, all of Fed. Rep. of Germany

[73] Assignee: Metz Mannheim GmbH, Mannheim, Fed. Rep. of Germany

[21] Appl. No.: 466,288

[22] PCT Filed: Aug. 12, 1989

[86] PCT No.: PCT/DE89/00530

§ 371 Date: Apr. 5, 1990

§ 102(e) Date: Apr. 5, 1990

[87] PCT Pub. No.: WO90/02100

PCT Pub. Date: Mar. 8, 1990

[30] Foreign Application Priority Data

Aug. 16, 1988 [DE] Fed. Rep. of Germany ....... 3827715

[51] Int. Cl.$^5$ ................................................ C02F 3/30
[52] U.S. Cl. ..................................... 210/151; 210/259;
210/262; 210/307; 210/311; 210/903
[58] Field of Search ............... 210/150, 151, 259, 307,
210/311, 312, 313, 903, 261, 262, 605, 615

[56] References Cited

U.S. PATENT DOCUMENTS

| | | | |
|---|---|---|---|
| 853,217 | 5/1907 | Bordigoni | 210/150 |
| 3,112,261 | 12/1963 | Porter et al. | 210/150 |
| 3,371,033 | 2/1968 | Simmone et al. | 210/150 |
| 4,322,296 | 3/1982 | Fan et al. | 210/903 |
| 4,895,645 | 1/1990 | Zorich, Jr. | 210/150 |
| 4,915,841 | 4/1990 | Langana et al. | 210/615 |

FOREIGN PATENT DOCUMENTS

| | | |
|---|---|---|
| 293521 | 12/1988 | European Pat. Off. . |
| 3419139 | 11/1985 | Fed. Rep. of Germany . |
| 3431568 | 3/1986 | Fed. Rep. of Germany . |
| 1110962 | 2/1956 | France . |
| 199690 | 4/1989 | Japan . |
| 26013 | 4/1909 | United Kingdom . |

OTHER PUBLICATIONS

Song et al., "Media Design Factors for Fixed Bed Filters"-Journal Water Pollution Control Federation, vol. 58, No. 2, Feb. 1986.

Parker et al., "Effect of Plastic Media Configuration on Trickling Filter Performance", Journal Water Pollution Control Federation, vol. 56, No. 8, Aug. 1985.

Walker, Jr. et al., "Biological Treatment of Nitrate Wastewater Using Fluidized Bed Bioreactors", Biotechnology and Bioengineering, No. 11, May 1981.

*Primary Examiner*—Stanley S. Silverman
*Assistant Examiner*—Christopher Upton
*Attorney, Agent, or Firm*—Collard, Roe & Galgano

[57] ABSTRACT

A water treatment module (14) has a sedimentation compartment (20), into which water is introduced under high pressure. A filter or microsieve (1) can be provided upstream of the sedimentation compartment (20). Above the sedimentation compartment (20) there is located a flooded first fixed bed reactor (22) for microbiological denitrification, which is flowed through from below. The water travels by way of an overflow device (34) and a sprinkler system (36) through which dissolved nitrogen is stripped and oxygen enrichment from the air occurs, into a second fixed bed reactor (38) for microbiological denitrification. This is constructed as a drip device, and is flowed through by air in a chimney-like fashion. Below the second fixed bed reactor (38) is located a catch basin (44) with a drain (54).

8 Claims, 1 Drawing Sheet

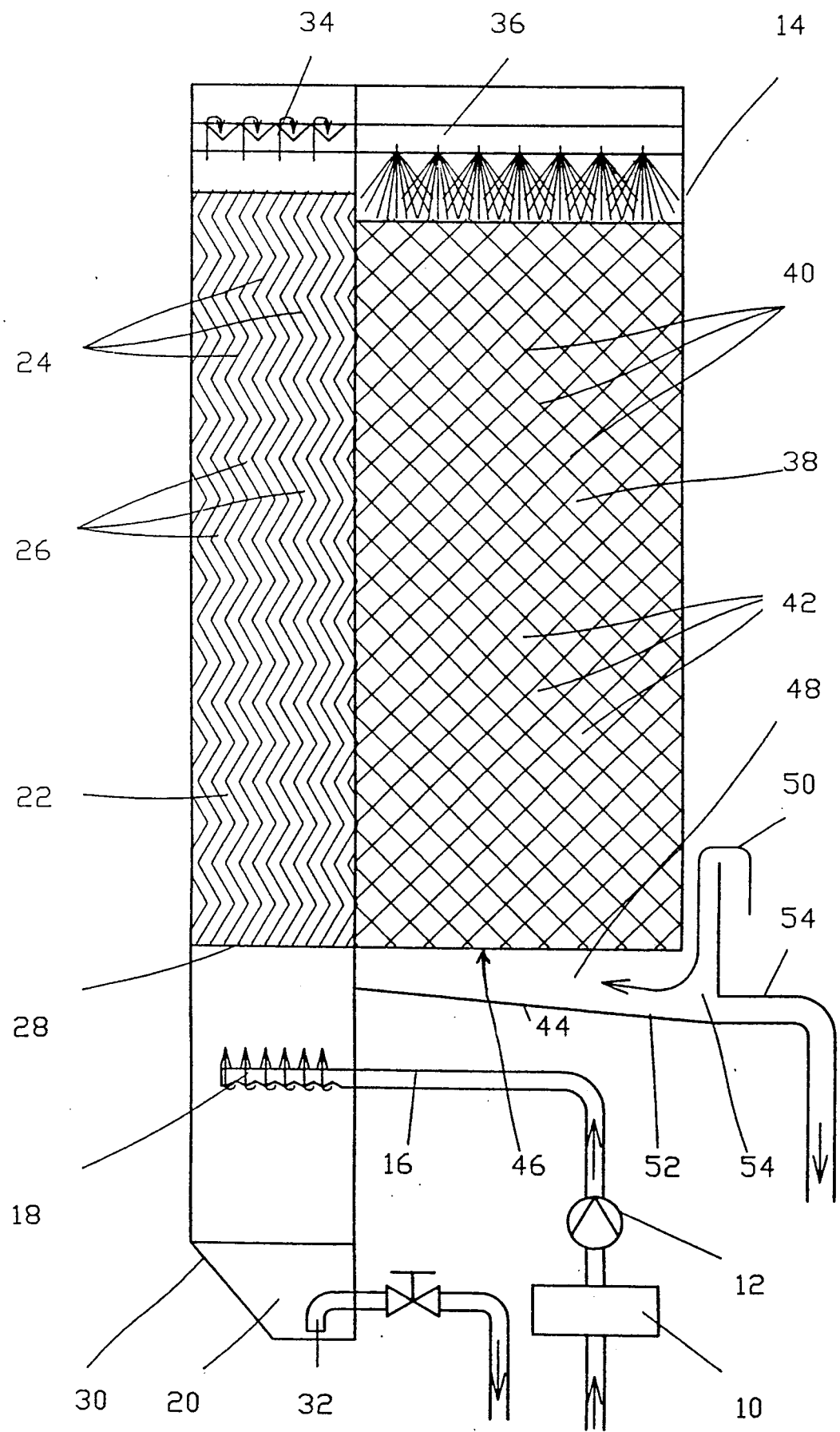

DEVICE AND METHOD FOR MICROBIOLOGICAL WATER TREATMENT

The object of the invention is to provide an efficient method of microbiological water treatment and a simply constructed, compact, and easy to use device for its accomplishment, which is particularly suited for modular construction.

This object is accomplished by a method in which water is successively subjected to a mechanical separation of solids, a microbiological denitrification in a fixed bed reactor, an enrichment with oxygen and a microbiological nitrification in a fixed bed reactor.

Through the mechanical separation of solids, undissolved impurities are removed from the water and kept away from the microbiological water treatment stage, whereby its effectiveness is improved. By virtue of the microbiological denitrification under anoxic conditions, nitrates present in the water are transformed to gaseous nitrogen and the nitrate level of the water is accordingly reduced. This is accomplished very efficiently in an overflowed fixed bed reactor. The subsequent enrichment of the water with oxygen creates the prerequisite for an effective microbiological nitrification under aerobic conditions in a further fixed bed reactor, in which ammonia built up by decomposition of biological substances containing nitrogen is oxidized through nitrite to nitrate. On the whole, this results in an efficient decomposition of nitrogen compounds contaminating the water. Subsequent to the microbiological nitrification, the water can be recirculated in partial stream for microbiological denitrification in order to produce an advantageous return of water containing nitrates.

The device developed by the invention for microbiological water treatment has a sedimentation compartment, into which water under high pressure is introduced through a feeder, a flooded first fixed bed reactor located above the sedimentation compartment for microbiological denitrification, which is flowed through from below, an overflow device located above the first fixed bed reactor, connected to a sprinkler system located above a second fixed bed reactor designed as a drip device for microbiological nitrification, and a catch basin with a drain under the second fixed bed reactor. By virtue of this device, microbiological water treatment is preceded by a simply designed, highly effective separation of solids through sedimentation in the sedimentation compartment. Through the sprinkling of water in the sprinkling system provided above the second fixed bed reactor, the water is divided in a non-continuous stream, stripped of nitrogen, carbon dioxide and other gases dissolved in the water, and enriched with oxygen in a simple process. The fact that the fixed bed reactor of the microbiological denitrification stage is a rising flow device and the fixed bed reactor of the nitrification stage a gravity-fed drip device is a significant advantage in light of the necessary pumping capacity and a compact system design.

In the feeder of the device developed by the invention there can be installed, in addition to the previously mentioned sedimentation compartment, an additional mechanical solid separator, in particular a filter, preferably a thin layer filter or a microsieve. The separation of solids serves to free the water to be treated from coarse solid waste up to impurities in colloidal form, and to keep these substances away from the microbiological water treatment stage. An additional mechanical solid separation device can also be installed in the drain thereof. There exists for example the possibility of constructing the catch basin itself as a sedimentation container, or to provide a sedimentation sink downstream of the catch basin. Alternatively or additionally, a filtering or microsieving of the water treated may also occur in the drain. The water is thus completely freed from solids generated by the microbiological water treatment, in particular immobilized biomass swept along from the fixed bed reactors.

The fixed bed reactor lying in the denitrification zone is preferably a block consisting of segments which enclose vertically rising closed channels. On the other hand, the fixed bed reactor lying in the nitrification zone is preferably constructed of segments which enclose internally communicating and in particular transversing channels. However, differently-formed segments may also be used. The segments are preferably composed of drawn plastic foil. They have a large surface bordering on the channels, which are well-suited for settling of microorganisms.

Alternatively, one or both fixed bed reactors are constructed as fluidized bed reactors.

The feeder leading to the device developed by the invention can be connected to a distributor arranged in the sedimentation compartment. Thereby a good distribution of the water is obtained as well as an efficient utilization of the first fixed bed reactor lying in the denitrification zone.

Preferably from the base of the sedimentation compartment there leads a sludge drain by which sedimented solids, in particular immobilized biomass loosened from the first fixed bed reactor, can be removed in a simple fashion if the need exists. If the catch basin is designed as a sedimentation compartment it is recommended that the same also be equipped with a sludge drain on the bottom.

At the lower end of the fixed bed reactor, there should be an air entrance above the catch basin. An inflow of air is thereby guaranteed to the second fixed bed reactor lying in the nitrification zone in a chimney effect, i.e., in a simple fashion without the need for a blower.

The device developed by the invention is preferably a compact module with all connections on a single side. Thus it is possible to arrange in one row a number of parallel connecting modules corresponding to the desired capacity without any problem.

In the following, the invention is illustrated by means of a drawing which schematically shows a device for microbiological water treatment.

At the entry of the device is located a mechanical filter 10 for example in form of a plate filter, in which the water is freed from coarse solids, corresponding to the fineness of the sieve of the filter plates. Instead of filter 10, another mechanical separator, in particular a microsieve may be used. By means of a pump 12, the water coming out of the filter or microsieve is transported under high pressure to the water treatment module 14 through whose feeder 16 it reaches a distributor 18 lying in a sedimentation compartment 20. A first fixed bed reactor 22 is arranged above the distributor in which a microbiological denitrification of the water takes place. The fixed bed reactor 22 consists of segments 24 which are produced of drawn plastic foil and which enclose vertically rising closed channels 26. The distributor 18 is arranged at some distance from the base 28 of the fixed bed reactor 22. It serves to distribute the water in the sedimentation compartment 20 over the entire cross-section thereof. The current situation is comparatively calm so that suspended matters still contained in the water as well as the immobilized biomass set free from the fixed bed reactor 22 have the opportunity to sediment in reverse current to the vertically rising water current. The sedimentation compartment 20 tapers downward with at least one sloping wall 30. The wedge or cone form of the sedimentation compartment promotes the development of an eddy flow which has an advantageous effect on the agglomeration and flocculation of solids. The base of the sedimentation compartment 20 is provided with a sludge drain 32, from which deposited sludge can be periodically drained.

The surface of the segments 24, which forms the boundary of the channels 26, is the settling area for the sesille microorganisms, which under anoxic conditions perform the microbiological water purification, including denitrification. The nitrates dissolved in the water are thereby transformed to gaseous nitrogen. In principle, in the absence of dissolved oxygen, the microorganisms absorb or respirate the chemically bound oxygen of the nitrate, whereby the nitrate is reduced and transformed to gaseous nitrogen. Simultaneously, the organic carbon compounds present in the water are consumed.

Above the first fixed bed reactor 22 is located an overflow trough 34 which leads the water through a sprinkler pipe 36 to the consequent nitrification stage. By virtue of the sprinkling, which can take place for example through a sprinkler system with jets pointed upward, through dripping onto an impact plate, or a cascade of impact plates as well as other means, the water is distributed in a non-continuous stream. Thereby, dissolved gases in the water, in particular nitrogen and carbon dioxide, are stripped and the water simultaneously enriched with oxygen from the air. Beside the first fixed bed reactor 22 but separated therefrom stands a second fixed bed reactor 38, upon which the water is sprinkled. The second fixed bed reactor 38 is a dripping device, which is likewise constructed of segments 40, composed of drawn plastic foil. In contrast to the enclosed rising channels of the first fixed bed reactor 22, the channels 42 formed between the segments 40 of the second fixed bed reactor 38 transverse one another in manifold fashion, so that a lateral distribution and long-duration drip process of the water are guaranteed.

Under the second fixed bed reactor 38 there is located a catch basin 44. This is designed so that between the water which collects there and the underside 46 of the second fixed bed reactor 38 an air gap 48 remains, into which an air draft from the outside can occur, as shown by arrow 50. The second fixed bed reactor 38 is thus provided with a constant supply of oxygen through a chimney-like rising stream of fresh air. In the second fixed bed reactor 38 there occurs a nitrification of the water under aerobic conditions through microorganisms which settle on the surface of segments 40, by virtue of which ammonia is broken down (oxidized) through nitrite to nitrate.

The catch basin 44 has a downward sloping base 52, from the lowest point of which the drain 54 of the water treatment module departs. The drain 54 can lead to a sedimentation basin or to a further filter or microsieve (not shown). There also exists the possibility of constructing the catch basin 44 itself as a sedimentation container.

The fixed bed reactors 22, 38 of the denitrification- and/or nitrification zone can also be constructed of differently designed segments or support materials, or constructed as a fluidized bed reactor (not shown). The water treatment module 14 has all its connections on one side so that several parallel-operating water treatment modules 14 approximating the desired capacity can be set up in a row.

List of References

10: filter, microsieve
12: pump
14: water treatment module
16: feeder
18: distributor
20: sedimentation compartment
22: first fixed bed reactor
24: segment
26: channel
28: lower side
30: sloping wall
32: sludge drain
34: overflow trough
36: sprinkler pipe
38: second fixed bed reactor
40: segment
42: channel
44: catch basin
46: lower side
48: air gap
50: arrow
52: base
54: drain

We claim:

1. A device for the microbiological treatment of water, including the elimination of nitrogen therefrom, which comprises
   (a) a sedimentation compartment,
   (b) a distributor disposed in the sedimentation compartment,
   (c) a feeder of water to be treated, the feeder being connected to the distributor for introducing the water into the sedimentation compartment,
   (d) a first fixed bed reactor for microbiological denitrification of the water, the first fixed bed reactor being positioned above the sedimentation compartment and having a base arranged at some distance from the distributor, the distributor distributing the water over the whole cross-section of the first fixed bed reactor and the first fixed bed reactor comprising
       (1) a block consisting of segments composed of drawn plastic foil defining vertically rising closed channels therebetween wherethrough the water flows from below and whereby the first fixed bed reactor is flooded,
   (e) an overflow device disposed above the first fixed bed reactor,
   (f) a sprinkler system connected to the overflow device,
   (g) a second fixed bed reactor arranged below the sprinkler system to receiver the water therefrom for the microbiological nitrification thereof, the second fixed bed reactor comprising
       (1) a block of segments composed of drawn plastic foil defining therebetween internally communicating and intersecting channels wherethrough the water flows downwardly, and (h) a drainage system disposed below the second fixed bed reactor, the drainage system comprising a catch basin.

2. The water treatment device of claim 1, further comprising a mechanical solid separator arranged in the feeder.

3. The water treatment device of claim 2, wherein the separator is a plate filter.

4. The water treatment device of claim 2, wherein the separator is a microsieve.

5. The water treatment device of claim 1, further comprising a sludge drain connected to the bottom of the sedimentation compartment.

6. The water treatment device of claim 1, wherein the second fixed bed reactor has a base defining an air gap with the catch basin disposed therebelow.

7. The water treatment device of claim 1, wherein the catch basin is a sedimentation compartment.

8. The water treatment device of claim 1 and constructed as a compact module with all water feeder and drainage connections at one side.

* * * * *